3,616,614
Patented Nov. 2, 1971

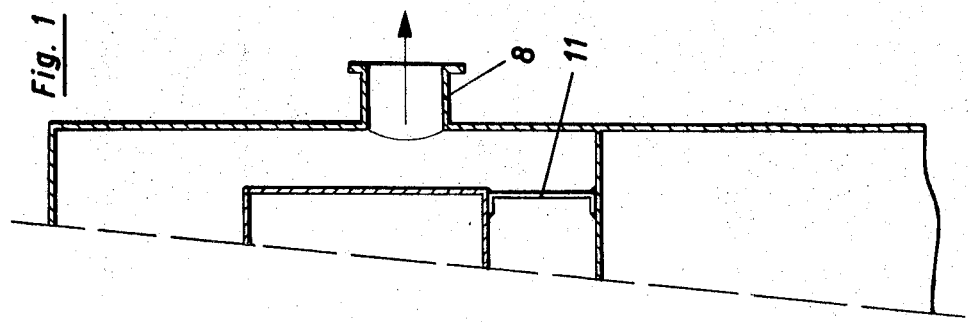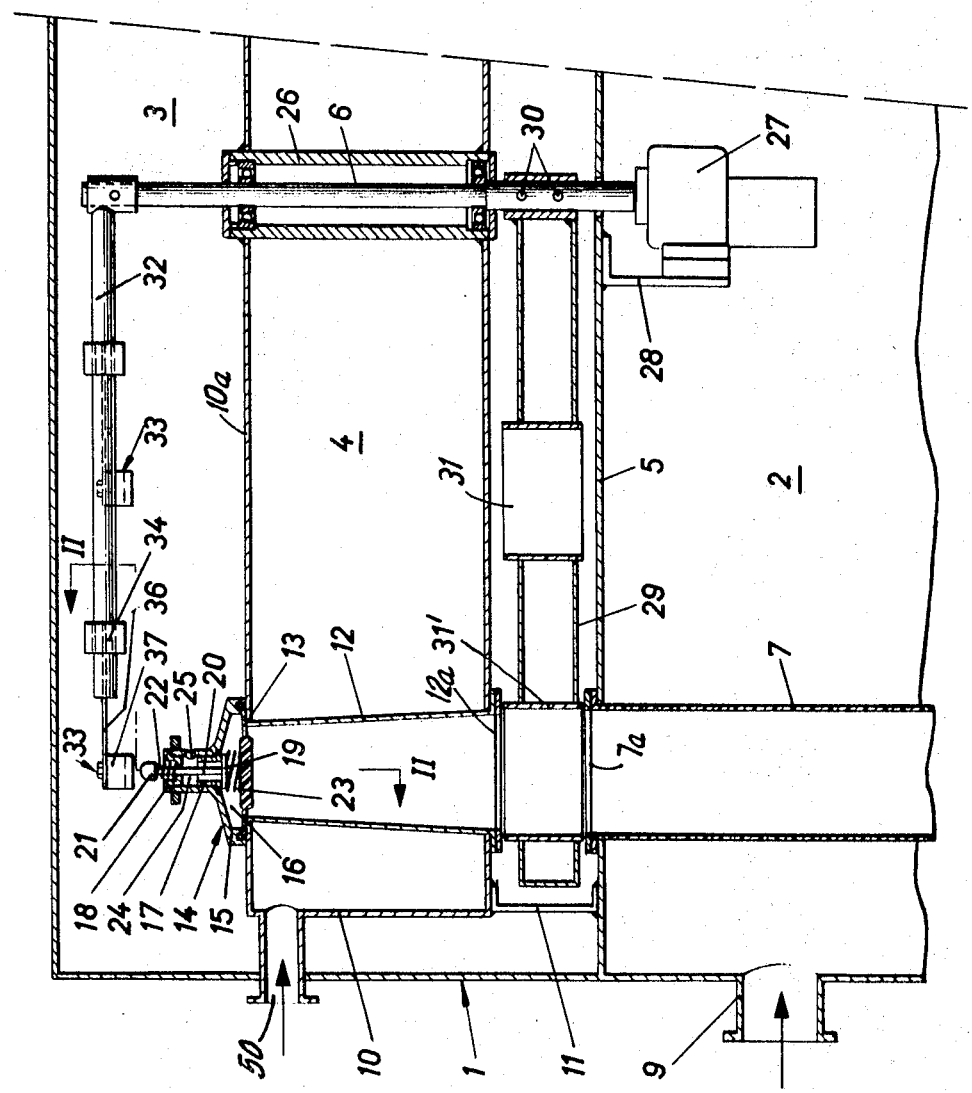

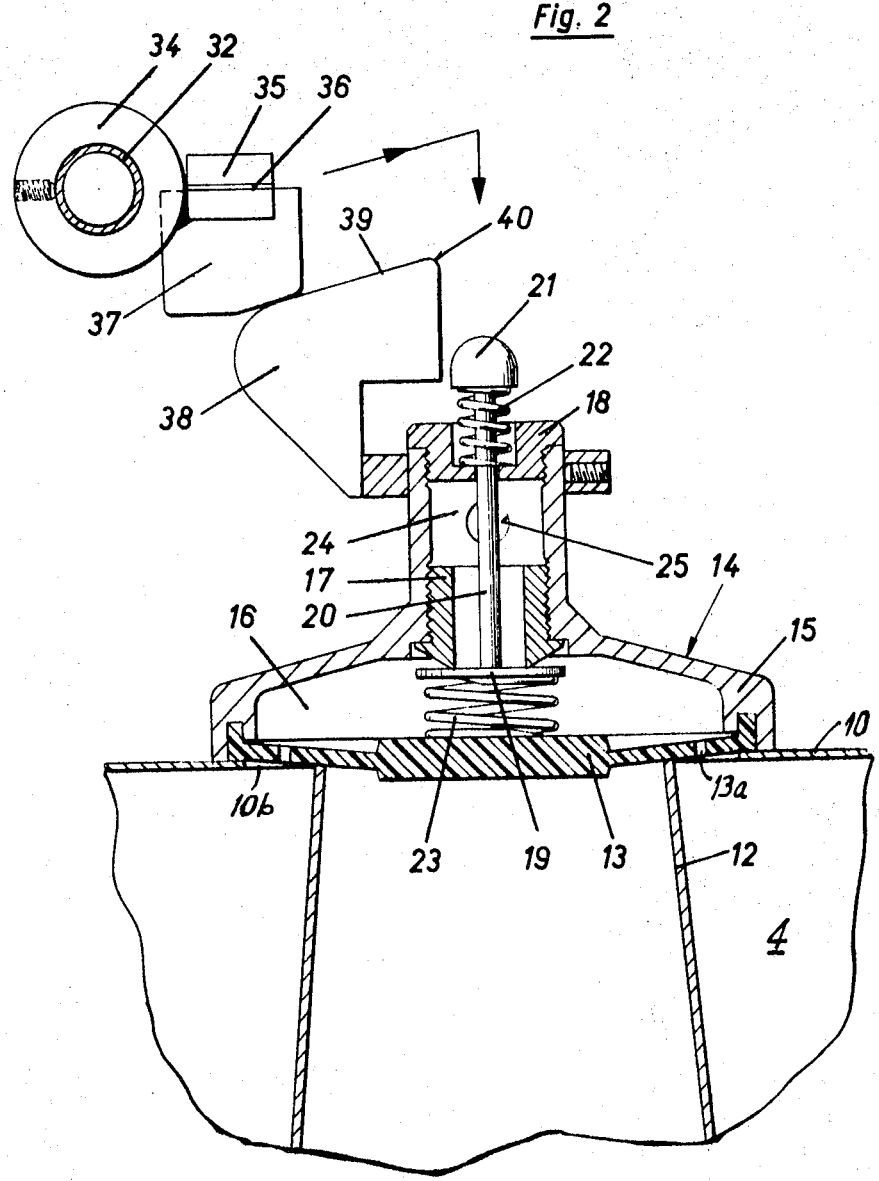

3,616,614
PNEUMATIC DUST REMOVAL MACHINE
Edwin B. Eisenegger, Bronschhofen, Switzerland, assignor to Gebruder Buhler AG, St. Gall, Switzerland
Filed June 18, 1969, Ser. No. 834,434
Claims priority, application Switzerland, June 20, 1968, 9,204/68
Int. Cl. B01d 46/04
U.S. Cl. 55—294          7 Claims

ABSTRACT OF THE DISCLOSURE

A pneumatic dust removal machine includes a dusty air chamber having a plurality of filter hoses having exterior sides which communicate with the dusty air chamber and an interior which communicates at one end with a clean air chamber. A rinsing air chamber is mounted within the clean air chamber and it carries a blow nozzle having one end of which is aligned with the end of the filter hose communicating with the clean air chamber. The rinsing air chamber is spaced away from the dusty air chamber and in the space therebetween there is moveable an arm member which carries a connecting tube which may be aligned with the blow nozzle and the filter hose. The arm member is moved in conjunction with an actuating member which opens a valve disposed between a connection of the blow nozzle at its opposite end to the rinsing air chamber. As the valves of each hose are actuated the connecting tube will be aligned between the blow nozzle and the filter hose to permit the rinsing air to move through the blow nozzle and the connecting tube into the filter hose. Subsequently, the valve is closed and a connecting tube moved out of alignment between the blow nozzle and the filter hose to continue the communication of the interior of the filter hose to the clean air chamber which discharges through an outlet.

SUMMARY OF THE INVENTION

This invention relates in general to the construction of dust removal machines and in particular to a new and useful pneumatic dust removal machine which includes a dusty air chamber having one or more filter hoses each of which is exposed on its interior to the dusty air chamber and is connected at one end of its interior to a clean air chamber, and wherein means are provided for periodically connecting a rinsing air supply to the interior of the filter hose and to temporarily isolate the interior from the clean air chamber.

In the operation of pneumatic dust removal machines, it is preferable to use only a small over pressure in the filter hoses when it is desirable to clean the hoses by directing a counter current rinsing air therethrough. It is desirable however, that this over pressure be built up virtually instantaneously if a good cleansing effect is to be achieved. It is known to employ a counter-current cleansing arrangement for such devices which include filter hoses which terminate in a clean air chamber. A rinsing air nozzle is provided in the clean air chamber which is periodically actuated and which is located above the mouth of the respective filter hose at a spaced distance therefrom. This rinsing air nozzle is operated to direct a rinsing air flow into the filter hose and to form an over pressure in respect to the dusty air chamber surrounding the hose. Such systems have the disadvantage that clean air is pulled with the rinsing air back into the filter hose while the rinsing air current is operative. The kinetic energy of the rinsing air and the kinetic energy of the clean air must be mutually equalized in the process. Because the clean air is at substantially no kinetic energy, the consequence is a poor efficiency of the cleaning device. In addition, the pressure build-up in the filter hose progresses too slowly and the cleaning action is not as good as desired.

Attempts to eliminate the above disadvantages, by arranging the ends of the filter hoses so that they are in a common plane and employing a moveable arm to move into association with each filter hose during rotation thereof, results in the establishment of an over pressure in the filter hose to be cleaned only gradually and thus a poor cleaning action is achieved. In addition, the continuous discharge of the rinsing air makes the efficiency of such a machine even worst than in the other embodiments.

Attempts have been made to achieve an instantaneous build-up of pressure in the filter hose by various arrangements but they have the common disadvantage that either they cannot achieve a quick build-up of the over pressure in the filter hose or they involve undesirable constructional problems in respect to the packing of the various parts which must be employed for the valving operation. In addition, it is difficult to achieve a compact design of a dust removal machine with such devices.

In accordance with the present invention, there is provided a pneumatic dust removal machine which employs a counter-current rinsing air cleansing device which can be operated at high efficiency in respect to dust removal and the design may be made relatively compact. In accordance with the invention, an interspace between a rinsing air chamber, which is arranged in a fresh or clean air chamber, and the dusting air chamber carries a rotating member having a tubular part which may be aligned between each blow nozzle for cleaning or rinsing air and the interior of the filter hose which is arranged in the dusting air chamber. The construction includes an actuating member rotatable with the rotating member for actuating a valve located between the blow nozzle and the rinsing air chamber. When opened, the valve permits a rapid flow from the rinsing air chamber through the nozzle and through the connecting tube into the filter hose. The arrangement is such that no packing problems need be solved since the rinsing air is supplied directly from the nozzle through the aligned tube in the interspace to the filter hose. The arrangement is such that a rinsing air under great pressure may be employed without any difficulty. In the arrangement the stationary blow nozzles are in a fixed position in respect to the rinsing air chamber and the valve mechanism permits a communication of the rinsing nozzble with the rinsing air chamber supply through a surrounding annular space and into an intermediate pressure chamber of the valve housing. The arrangement permits quick opening of the rinsing valve and an instantaneous build-up of an over pressure in the filter hose when the rinsing air is being employed.

Accordingly, it is an object of the invention to provide an improved pneumatic dust removal machine which comprises a dusty air chamber having one or more filter hoses with the exteriors exposed to the dusty air and with the interiors communicating at one end to a clean air chamber and which includes connecting means which may periodically be operated to connect the hoses to a blow nozzle, and valve means which are also operated to connect the blow nozzle to a rinsing air chamber for directing the air into the filter hose.

A further object of the invention is to provide a pneumatic dust removal device which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

BRIEF DESCRIPTION OF THE DRAWINGS

In the drawings:

FIG. 1 is a partial vertical sectional view of the upper portion of a dust removal machine constructed in accordance with the invention; and FIG. 2 is an enlarged vertical section taken along the line II—II of FIG. 1.

GENERAL DESCRIPTION OF THE PREFERRED EMBODIMENT

Referring to the drawings in particular, the invention embodied therein comprises a housing generally designated 1 which is divided into a dusty air chamber 2, a clean air chamber 3 and a rinsing air chamber 4. The dusty air chamber is separated from the clean air chamber by an intermediate bottom or wall 5. A plurality of filter hoses 7, having filter-action walls, are suspended from the intermediate bottom 5 and they are arranged in two concentric circles around a shaft 6. Only one filter hose 7 is visible in FIG. 1 and this is the hose of an outer circle arrangement, the inner circle arrangement not being indicated. The upper ends of the filter hoses 7 communicate directly in to the clean air chamber 3 and they terminate in mouths or entrances which are arranged in a common plane.

Dusty air is directed into an inlet 9 connected to the dusty air chamber 2 and the air which flows through the walls of the filter 7 is directed through the upper end thereof into the clean air chamber 3 and exits through an outlet or discharge opening 8. A pressure drop exists between the inlet 9 and the outlet 8. Due to this pressure drop, the dust laden air enters the dusty air chamber 2 and passes into the interior of the filter hoses 7 and then upwardly to the clean air chamber 3 and out the outlet 8.

In accordance with a feature of the invention, a rinsing air chamber 4 is formed by a housing 10 which is mounted above the intermediate bottom 5 on brackets 11 so as to leave a defined space between the bottom of the housing 10 and the intermediate bottom 5. Rinsing air is directed into an inlet 50 and the interior of the rinsing chamber 4 is maintained under a rinsing air pressure. A plurality of blow nozzles 12 are arranged in the rinsing air chamber in positions to overlie each filter hose 7. Each nozzle 12 includes a mouth or delivery opening 12a which is arranged in alignment with the filter hose 7 top opening or mouth 7a. The termination planes of the mouths, 12a of the nozzles 12 and the mouth 7a of the filter hoses 7 are parallel and spaced apart.

An upper wall 10a of the housing 10 is provided with an opening 10b (FIG. 2) which lies in the plane of the top of each nozzle 12. Each nozzle 12 is closed at its upper end by a diaphragm 13 of a valve 14. The diameter of the diaphragm is such that it also closes the opening 10b of the rinsing air chamber 4 but the diaphragm 13 may be opened to communicate the rinsing air chamber 4 with the top end of the nozzle 12 for flow through the nozzle.

The diaphragm 13 includes an annular marginal portion adjacent its periphery which is provided with one or more openings 13a which communicate the rinsing air chamber 4 to the interior of the housing 15 of the valve 14. The valve housing 15 forms a counter-pressure chamber 16 at the interior which also communicates through a hollow cylindrical part 17 to a hollow chamber 24 having a connection 25 extending to the chamber 3.

The top of the valve housing 15 is closed by a threaded screw part 18. The counter-pressure chamber 16 is closed off against the interior of the hollow part 17 by a valve disc 19. The valve disc 19 is joined to a valve stem 20 which is guided in the screw part 18 for movement in axial directions. An actuating head 21 carried at the upper end of the valve stem 20 is located in a position to be engaged by an actuating member during the operation of the device. A helical spring 22 disposed around the valve stem 20 between the head 21 and a screw part 18 urges the valve disc 19 to close the passage defined in the cylindrical part 17. A second helical spring 23 disposed between the valve disc 19 and the diaphragm 13 urges the diaphragm 13 against the mouth of the nozzle 12 thus closing the latter tightly. The pressure chamber 16 is counter balanced by a pressure in the chamber 3 which is normally at lower pressure than the chamber 16 and the rinsing air chamber 4.

In accordance with a further feature of the invention, communicating means are provided for periodically communicating each blow nozzle in turn with a respective filter hose by bridging the gap between the lower end of the blow nozzle and the upper end of the filter hose. In addition, valve actuating means are provided for actuating the valve mechanism 14 of each blow nozzle when the communication is established to cause a flow of air from the rinsing air chamber through the blow nozzle and the communication means to the filter hose. Such valve actuating and communicating means include a transmission shaft 6 which is mounted in a bearing 26 which extends through the housing 10. A motor 27 is supported on a bracket 28 at the interior of the dusty air chamber 27 and is connected to rotate the shaft 6. The communicating means for periodically connecting each filter hose to the associated blow nozzle includes an arm 29 which is secured to the shaft 6 by means of screws 30. The arm 29 carries two connecting tubes 31 and 31'. The inner tube 31 is located at a radial distance which corresponds to the radial distance of each filter hose which is arranged within an inner circle in respect to the shaft 6, and the tube 31 is arranged at a radial distance corresponding to the arrangement of each filter hose in an outer circle around the shaft 6. This make it possible, when the shaft 6 is rotated, to bring the respective connecting tubes 31 and 31' into a position in alignment with the associated filter hose 7 of each concentric arrangement of such hoses. When a tube 31' is aligned with the nozzle 12 as indicated in FIG. 1, the gap between the mouth 12a of the blow nozzle 12 or the mouth 7a of the filter hose 7 and the connecting tube 31' is negligible with respect to the amount of rinsing air losses which would occur in such location without the connecting means arrangement.

The shaft 6 also carries a valve actuating mechanism which includes an outrigger or arm 32 which is arranged substantially parallel to the arm 29 but located above the housing 10. Actuating elements 33 are mounted on the arm 32 at locations for actuating the inner and outer concentric circular arrangement of the nozzle sets as described above. The actuating elements 33 at each location are of identical arrangement and construction and only one of these elements is described in detail. The actuating element 33 includes a sleeve 34 which is affixed to the arm 32, as best seen in FIG. 2. Fastened to the sleeve 34 is a support 35. One end of a leaf spring 36, which is arranged parallel to the arm 32, is attached to the support 35 and a hammer 37 is fastened to the free end of the leaf spring. As can be seen in FIG. 2, there is a cam 38 which is affixed to the housing 15 and which carries a guide surface 39. When a shaft fixed with the arm rotates, the hammer strikes against the cam 38 and follows the guide surface 39 as the rotation continues. In so doing, the leaf spring 36 is directed upwardly and flexed. When the hammer goes beyond the edge 40 of the end of the guide surface 39, the leaf spring 36 relaxes and strikes with the hammer 37 against the head 31. The valve stem 20 then moves downwardly against the biasing force of the springs 22 and 23 to lift the valve body 19 off the hollow part 17. This causes the pressure in the counter pressure chamber 16 to collapse suddenly and the over pressure which prevails in the rinsing air chamber 4 suddenly lifts the diaphragm 13 off the upper end of the blow nozzle 12 so that the rinsing air can suddenly enter the blow nozzle 12 below the diaphragm. The hammer 37 is moved off the edge 40 to strike the head 21 at the same time that the connecting tube 31 becomes aligned with the lower end mouth 12a of the nozzle 12 and the upper end mouth 7a of the filter hose 7. The connecting tube 31 therefore closes off the end of the filter tube 7 to the clean air chamber 3 and permits the rinsing air from the chamber 4 to flow downwardly through the nozzle 12, the connecting tube 31 and into the filter hose 7 without clean air being taken along as a secondary air into the filter hose.

When the valve control mechanism is moved away from the head 21, the valve 19 is closed by the counter pressure in the chamber 16 within a shortest possible period of time. The counter pressure in the chamber 16 builds up until it becomes equalized with that of the rinsing air chamber 4 so that the diaphragm 13 again closes the blow nozzle 12 aided by the force of the helical spring 23 and also the differential forces which occur because the surfaces of the diaphragm 13 are differentially charged pneumatically. It is possible to design the hammer 37 such that it comprises a rocker which is movable against an elastic force for example. The precontrol of the rinsing air valve may also function electromechanically if desired. When the shaft 6 continues to rotate arm 29 and arm 32 will rotate together. The connecting tube 31' or the inner tube 31 will then reach the next filter hose 7 in the respective row. When this occurs then the valve opening mechanism will again be actuated.

What is claimed is:

1. A pneumatic dust removal device comprising a housing having walls defining a dust chamber including an inlet, a rinsing air chamber, and a clean air chamber having an outlet; a filter hose in said dust chamber having an air permeable wall with an exterior surface exposed to the interior of said dust chamber, and having an interior terminating in a mouth in flow communication with said clean air chamber, a blow nozzle having a nozzle inlet in said rinsing air chamber and having a nozzle discharge mouth spaced apart from, but aligned with, the mouth of said filter hose, said dust chamber including means for avoiding by-pass of the filter hose, valve means controlling flow through said nozzle to said filter hose, and including a movable valve for closing and opening said nozzle inlet and a tubular member of a size to bridge the space between said nozzle discharge mouth and said filter hose mouth for connecting same and to exclude substantially complete communication of said nozzle discharge mouth with said clean air chamber, and operating means cooperable with said valve means and said tubular member to move said tubular member into alignment with and between said nozzle and said filter hose and to move said valve means to open the flow communication between said rinsing air chamber and said blow nozzle to cause air from said rinsing air chamber to be directed to said blow nozzle, said tubular member and into said filter hose, said operating means thereafter moving said tubular member out of alignment and closing said valve means to permit filtering, said housing including a separate housing portion within said clean air chamber defining said rinsing air chamber, said blow nozzle extending through said separate housing portion and having said nozzle discharge mouth terminating in said clean air chamber, said rinsing air chamber having an annular opening around said nozzle at the opposite end thereof from said nozzle discharge mouth, said valve means including said movable valve, a diaphragm closing said opposite end of said nozzle and the annular area there around in said rinsing air chamber, said movable valve having a portion exposed in said clean air chamber, said operating means including a member movable to engage the exposed portion of said valve to open said diaphragm for communicating said rinsing air chamber to said nozzle and including a rotatable shaft, an arm connected to said shaft, a hammer member carried by said arm, and means in the path of movement of said arm to cock said hammer member, said hammer member being movable off said cocking means to engage said valve to displace said valve.

2. A pneumatic dust removal device according to claim 1, including a tube carrying arm connected to said shaft for rotation therewith, said tubular member being carried on said tube carrying arm and being movable therewith into alignment between said nozzle and said filter hose when said hammer is in a position to strike said valve member.

3. A dust removal device comprising a porous filter hose having an air-permeable wall with an exterior surface exposed to a solid-gas mixture, and having an interior terminating in a mouth, means for avoiding by-pass of the filter hose, wall means defining a discharge passage communicating with said mouth for conducting filtered gas away from said filter hose, a blow nozzle having an inlet connected to a gas source under pressure and having a discharge aligned opposite to and spaced from said filter hose mouth, a valve closing the inlet of said blow nozzle and having an exposed actuator part for opening said valve to permit gas flow through said blow nozzle from said source and discharge towards said mouth, a connecting tube located in said discharge passage in the area between said nozzle discharge and said mouth and connecting same, and operating means including a member connected to said connecting tube and movable to periodically position said connecting tube in alignment between said nozzle discharge and said mouth and to simultaneously mechanically actuate said exposed actuator part to open said valve abruptly to permit the gas under pressure to enter said inlet at full pressure to be discharged from said nozzle and into said filter hose to direct the gas under pressure in a reverse direction through the walls of said filter hose for cleaning said hose, said operating means moving said connecting tube out of alignment with said nozzle and mouth and closing said valve means to permit filtering.

4. A dust removal device according to claim 3, wherein said operating means member comprises a rotatable shaft portion, a first arm connected to said connecting tube and affixed to said shaft portion for rotation therewith and a second arm connected to said shaft portion for rotation therewith and being movable through a path to engage said valve actuator part at the same time as said first arm moves said connecting tube into alignment between said nozzle discharge and said filter hose mouth.

5. A pneumatic dust removal device comprising a housing having walls defining a dust chamber including an inlet, a rinsing air chamber, and a clean air chamber having an outlet; a filter hose in said dust chamber having an air permeable wall with an exterior surface exposed to the interior of said dust chamber and having an interior terminating in a mouth in flow communication with said clean air chamber, a rinsing air blow nozzle having a nozzle inlet in said rinsing air chamber and having a nozzle mouth discharge spaced apart from, but aligned with the mouth of said filter hose, said dust chamber including means avoiding by-pass of the filter hose, valve means controlling flow through said nozzle to said filter hose including a movable valve for closing and opening said nozzle inlet and a tubular member of a size to bridge the space between said nozzle mouth discharge and said filter mouth and to exclude substantially complete communication of said nozzle mouth discharge with said clean air chamber, and operating means cooperable with said valve means and said tubular member to move said tubular member into alignment with and between said nozzle and said filter hose and to move said valve means to open the flow communication between said rinsing air chamber and said blow nozzle to cause air from said rinsing air chamber to be directed to said blow nozzle, said tubular member and into said filter hose, said operating means moving said tubular member out of alignment and closing said valve means to permit filtering, said blow nozzle having a nozzle mouth discharge terminating in said clean air chamber, said rinsing air chamber having an annular opening around said nozzle at the opposite end thereof from said mouth, said valve means including said movable valve, a diaphragm closing said opposite end of said nozzle and the annular area therearound in said rinsing air chamber, said movable valve having a portion exposed to the exterior of the rinsing air chamber, said operating means including a member movable to engage the exposed portion of said valve to open said diaphragm for communicating said rinsing air chamber to said nozzle and including a rotatable shaft, an arm movable by said shaft, a hammer member carried by said arm, and means in the path of movement of said arm to cock said hammer member, said hammer member being movable off said cocking means to engage said exposed portion of said valve to displace said movable valve.

6. A pneumatic dust removal device, according to claim 5, wherein said rinsing air chamber is located above said clean air chamber, said rinsing air nozzle traversing said rinsing air chamber.

7. A pneumatic dust removal device, according to claim 5, wherein said rinsing air chamber is located within said clean air chamber, said rinsing air nozzle being also located in said clean air chamber but communicating with said rinsing air chamber.

References Cited

UNITED STATES PATENTS

| 2,974,748 | 3/1961 | Swanson | 55—341 |
| 3,325,978 | 6/1967 | Rymer et al. | 55—294 |
| 3,385,033 | 5/1968 | Bashore et al. | 55—341 |
| 3,394,532 | 7/1968 | Oetiker | 55—302 |
| 3,487,609 | 1/1970 | Caplan | 55—302 |
| 1,109,997 | 8/1914 | Lob | 55—287 |

DENNIS F. TALBERT, Jr., Primary Examiner

B. NOZICK, Assistant Examiner

U.S. Cl. X.R.

55—302, 341; 251—331